US011423087B2

(12) United States Patent
Carney Landow et al.

(10) Patent No.: US 11,423,087 B2
(45) Date of Patent: *Aug. 23, 2022

(54) NORMATIVE PROCESS OF INTERACTION WITH A REGISTRY OF VIRTUAL SPACES

(71) Applicant: DISH Technologies L.L.C., Englewood, CO (US)

(72) Inventors: Kate Megan Carney Landow, Denver, CO (US); John Anthony Card, II, Denver, CO (US)

(73) Assignee: DISH Technologies L.L.C., Littleton, CO (US)

( * ) Notice: Subject to any disclaimer, the term of this patent is extended or adjusted under 35 U.S.C. 154(b) by 14 days.

This patent is subject to a terminal disclaimer.

(21) Appl. No.: 17/039,590

(22) Filed: Sep. 30, 2020

(65) Prior Publication Data

US 2021/0019347 A1    Jan. 21, 2021

Related U.S. Application Data

(63) Continuation of application No. 15/858,902, filed on Dec. 29, 2017, which is a continuation of application
(Continued)

(51) Int. Cl.
*H04N 21/47* (2011.01)
*G06F 16/903* (2019.01)
(Continued)

(52) U.S. Cl.
CPC ......... *G06F 16/903* (2019.01); *A63F 13/213* (2014.09); *A63F 13/215* (2014.09);
(Continued)

(58) Field of Classification Search
None
See application file for complete search history.

(56) References Cited

U.S. PATENT DOCUMENTS 5,950,202 A    9/1999 Durward et al.
6,226,669 B1    5/2001 Huang et al.
(Continued)

FOREIGN PATENT DOCUMENTS

EP       1925349       5/2008
EP       2 745 893 A2  6/2014
WO      2009039080     3/2009

OTHER PUBLICATIONS

Application No. PCT/US2018/067090, International Preliminary Report on Patentability, dated Jul. 9, 2020, 12 pages.
(Continued)

*Primary Examiner* — Cai Y Chen
(74) *Attorney, Agent, or Firm* — Kilpatrick Townsend & Stockton LLP

(57) ABSTRACT

Described are systems, methods, and computer program products for facilitating user access to virtual reality (VR) containers. A VR container registry may identify any type of container and optionally list requirements for accessing the container, constraints relating to when access is permitted, characteristics describing container features, lists of other containers accessible from within the container, container output formats, accepted input formats, etc. The registry may be organized in a hierarchical structure, make use of or be comparable to a domain name system, and include one or more top-level items each having one or more second-level items organized beneath. A service provider may host a VR container to facilitate user access to other VR containers, allow users to transfer between unconnected remote VR containers while staying within a VR session or without having to exit all VR sessions, and provide transformation services to ensure container and VR system compatibility.

20 Claims, 9 Drawing Sheets

Related U.S. Application Data

No. 15/858,556, filed on Dec. 29, 2017, now Pat. No. 10,489,458.

(60) Provisional application No. 62/440,915, filed on Dec. 30, 2016.

(51) Int. Cl.

| | | |
|---|---|---|
| *H04N 21/239* | (2011.01) | |
| *G06F 3/06* | (2006.01) | |
| *H04N 21/4722* | (2011.01) | |
| *H04N 21/431* | (2011.01) | |
| *A63F 13/87* | (2014.01) | |
| *A63F 13/35* | (2014.01) | |
| *A63F 13/213* | (2014.01) | |
| *A63F 13/215* | (2014.01) | |
| *H04N 21/81* | (2011.01) | |

(52) U.S. Cl.
CPC .............. *A63F 13/35* (2014.09); *A63F 13/87* (2014.09); *G06F 3/0667* (2013.01); *H04N 21/2393* (2013.01); *H04N 21/4316* (2013.01); *H04N 21/4722* (2013.01); *H04N 21/816* (2013.01)

(56) References Cited

U.S. PATENT DOCUMENTS

| | | | |
|---|---|---|---|
| 10,489,458 | B2 | 11/2019 | Carney Landow et al. |
| 10,831,830 | B2 | 11/2020 | Carney Landow et al. |
| 2003/0008712 | A1* | 1/2003 | Poulin .................. A63F 13/358 463/42 |
| 2003/0177187 | A1* | 9/2003 | Levine .................... A63F 13/10 709/205 |
| 2009/0077463 | A1 | 3/2009 | Koster |
| 2009/0089364 | A1* | 4/2009 | Hamilton Ii .......... G06F 16/954 709/203 |
| 2009/0100035 | A1 | 4/2009 | Cradick et al. |
| 2009/0262107 | A1 | 10/2009 | Castelli et al. |
| 2010/0041481 | A1 | 2/2010 | Smedley et al. |
| 2011/0014985 | A1 | 1/2011 | Park et al. |
| 2012/0050257 | A1 | 3/2012 | Clarke |
| 2012/0054217 | A1 | 3/2012 | Clarke |
| 2017/0330365 | A1 | 11/2017 | Adamov et al. |
| 2018/0210969 | A1 | 7/2018 | Carney Landow et al. |
| 2018/0213277 | A1 | 7/2018 | Carney Landow et al. |

OTHER PUBLICATIONS

Application No. PCT/US2018/067090, International Search Report and Written Opinion, dated Jun. 6, 2019, 17 pages.
Office action for EP 18837051 dated Jun. 24, 2022, all pages.

* cited by examiner

| | Identifier(s) | Requirement(s) | Constraint(s) | Characteristic(s) | |
|---|---|---|---|---|---|
| 405 | Colorado VR Library | Any | None | 2nd-Level Library, CO | Colorado |
| 410 | VR Library of Congress | Any | None | Top-Level Library | USA |
| 415 | Denver VR Library | Any | None | 3rd-Level Library, CO | Denver |
| 420 | History World | Android 5+ iOS 7+ | English, Password | History | Homework |
| 425 | New Mexico VR Library | Any | None | 2nd-Level Library, NM | New Mexico |
| 430 | Santa Fe VR Library | Any | None | 3rd-Level Library, NM | Santa Fe |
| 435 | Call of Duty World-Free | Oculus Rift, Sony PS VR | 13+ 3pm-9pm, 18+ other times | Activision | Video Game |
| 440 | Call of Duty World-Paid | Oculus Rift, Sony PS VR | 13+ 3pm-9pm, 18+ other times | Activision | Video Game |

FIG. 4

NORMATIVE PROCESS OF INTERACTION WITH A REGISTRY OF VIRTUAL SPACES

CROSS-REFERENCE TO RELATED APPLICATIONS

This application is a continuation of U.S. patent application Ser. No. 15/858,902, filed on Dec. 29, 2017, entitled "Normative Process Of Interaction with a Registry of Virtual Spaces," which application is a continuation of U.S. patent application Ser. No. 15/858,556, filed on Dec. 29, 2017, entitled "Normative Process of Interaction with a Registry of Virtual Spaces," now U.S. Pat. No. 10,489,458, issued on Nov. 26, 2019, which claims the benefit of and priority to U.S. Provisional Application No. 62/440,915, filed on Dec. 30, 2016, the disclosures of which are hereby incorporated by reference in their entirety for all purposes.

FIELD

This application relates generally to virtual reality systems. More particularly, this application relates to techniques for organizing a registry of virtual reality containers, techniques interacting with such a registry, techniques for simplifying access to virtual reality containers for end users, and techniques for obtaining supplemental content for use in a virtual reality container.

BACKGROUND

Various publishers may wish to host or create virtual reality (VR) worlds, and different publishers may use different VR formats or only support certain types of end user VR systems, leaving end users having a particular VR system unable to access VR worlds not supported by their particular VR system.

SUMMARY

Described herein are systems, methods, and computer program products for facilitating end user access to virtual reality (VR) containers, including allowing end users access to supplemental information within a VR container. A universal VR container registry may be created to allow end users to find VR containers of interest. The registry may also allow end users to find VR containers compatible with VR systems possessed by the end users. The registry may also allow end users to find useful supplemental content. The registry may be universal in that any type of VR container or supplemental content may be listed in the registry, along with requirements needed for accessing the container or supplemental content, constraints relating to who or when access may be permitted, characteristics describing features of the container or supplemental content, and the like. The registry may also include information about how to access a container, which other containers may be linked to or accessed from within the container, types and formats of outputs generated by the container, types and formats of inputs accepted by the container, which supplemental content may be accessed from within the container, types and formats of supplemental content that may be accessed from within the container, etc. The registry may be organized in a hierarchical structure to allow for more efficient searching or modification of the registry.

The hierarchical structure may make use of or be comparable to a domain name system and include one or more top-level items each having one or more second level-items organized beneath. Optionally, a top-level registry provider may control or otherwise limit changes to the top-level registry and allow lower-level registries to be organized beneath a particular top-level entry. Such lower-level registries may be aggregated, for example, by agreement between a top-level registry provider and a lower-level registry provider. At lower levels of the hierarchy, local registries may be further organized beneath or within an upper level and optionally facilitated by agreement between a local registry provider and an upper level registry provider or control entity.

A service provider may provide a hosted VR container to facilitate end user access to other VR containers and supplemental content. The hosted VR container may correspond to an entry level or staging container and allow an end user to transfer between remote VR containers while staying within a VR session or without having to completely exit all VR sessions.

In an aspect, methods are provided, such as methods relating to service provider enabled access to remote VR systems. In some embodiments, a method of this aspect comprises establishing a first connection between a service provider virtual reality (VR) container and an end user VR system, such as a first connection that is associated with a service provider VR session; determining a first portal for accessing a first remote VR container from within the service provider VR session; populating the service provider VR container with the first portal; detecting input generated by the end user VR system within the service provider VR container corresponding to determination of a first access instruction for accessing the first portal; facilitating establishing a second connection between the first remote VR container and the end user VR system, such as a second connection that is associated with a first remote VR session; detecting input generated by the end user VR system corresponding to determination of a second access instruction for accessing a second portal, such as a second portal that corresponds to a second remote VR container; and facilitating establishing a third connection between the second remote VR container and the end user VR system, such as a third connection that is associated with a second remote VR session.

Optionally, methods of this aspect may identify or determine requirements and capabilities of the end user VR system, such as to ensure compatibility with various remote VR containers. Optionally, a method of this aspect may comprise or further comprise determining a type of an end user VR system, such as a type that corresponds, at least in part, to requirements and capabilities of the end user VR system. Optionally, determining the type includes exchanging handshake messages with the end user VR system. Optionally, determining the type includes receiving input corresponding to determination of the type of the end user VR system, such as user input identifying the type of the end user VR system. Optionally, a method of this aspect may comprise or further comprise obtaining supplemental content, such as in response to a request for supplemental content, and providing the supplemental content to the end user VR system.

In embodiments, various remote VR containers and supplemental content may be used with the methods of this aspect. For example, different remote VR containers may have different requirements and capabilities, may generate different outputs, and accept different inputs. For example, a method of this aspect may comprise or further comprise determining first requirements and first capabilities of the first remote VR container; and determining second requirements and second capabilities the second remote VR container. Optionally, the first requirements and first capabilities are different from the second requirements and second capabilities.

In some embodiments, different VR session types may be used with the methods of this aspect. For example, a server-side VR session generation technique may be employed. As an example, establishing the first connection optionally includes generating output, such as output that is compatible with the requirements of the end user VR system. Optionally, the output corresponds to a VR container output stream transmitted to the end user VR system. Optionally, establishing the first connection includes or further includes receiving a VR system output stream from the end user VR system.

Alternatively, an end user-side VR session generation technique may be employed. As an example, establishing the first connection optionally includes transmitting an instruction set associated with the service provider VR container for execution by the end user VR system; and receiving data output generated during execution of the instruction set.

It will be appreciated that multiple portals may be populating in the service provider VR container. These portals may take on different forms, depending on the end user system, characteristics of the VR container the portals represent, etc. Optionally, determining the first portal includes transmitting a query to a registry of virtual containers and receiving a query response identifying one or more virtual containers including the first remote VR container corresponding to the first portal. Optionally, the query includes the requirements or the capabilities of the end user VR system. Optionally, the query includes characteristics, constraints, or authentication credentials or tokens associated with a user of the end user VR system. Optionally, the query includes a characteristic or identifier for target VR containers, such as characteristics or identifiers received as input from an end user. Optionally, a method of this aspect comprises or further comprises receiving input corresponding to a determination of the characteristic or identifier. Optionally, the registry of virtual containers includes a plurality of entries. For example, each entry optionally corresponds to a virtual container. Optionally, each entry includes an identifier associated with the virtual container, a requirement associated with the virtual container, a constraint associated with the virtual container, and a characteristic associated with the virtual container. More details about registries useful with the methods of this aspect are described below.

Different representations for the various portals may be employed. For example, populating the service provider VR container with the first portal optionally includes obtaining one or more portal representations for the first portal and generating the first portal using a particular portal representation. Optionally, obtaining the one or more portal representations for the first portal includes obtaining the one or more portal representations for the first portal from a provider associated with the first portal. Optionally, obtaining the one or more portal representations for the first portal includes transmitting a query to a registry of virtual containers; and receiving a query response identifying the one or more portal representations. Optionally, the registry of virtual containers includes a plurality of entries, such as an entry that corresponds to a virtual container, and each includes an identifier associated with the virtual container, a requirement associated with the virtual container, a constraint associated with the virtual container, a characteristic associated with the virtual container, and one or more portal representations associated with the virtual container. Again, details regarding registries useful with methods of this aspect will be described below. Optionally, the particular portal representation corresponds to one of the one or more portal representations compatible with requirements and characteristics of the end user VR system. Optionally, the particular portal representation is associated with a time of day, a day of year, a day of week, a month of year, a season, a holiday, or a special event. Optionally, the particular portal representation is associated with authentication credentials or tokens associated with a user of the end user VR system.

It will be appreciated that the end user may access different portals from within the service provider VR session. It will also be appreciated that the end user may access a portal to another remote VR container from within a remote VR session. For example, detecting input generated by the end user VR system corresponding to determination of the second access instruction for accessing the second portal optionally includes detecting input generated by the end user VR system within the first remote VR session corresponding to determination of the second access instruction for accessing the second portal. Optionally, facilitating establishing the third connection occurs while the first remote VR session is active.

In some embodiments, a portal representation, as rendered in a VR session, may depict a static, animated, or changing image, which may be representative of the VR world associated with the portal, or may be selected by the end-user. As an example, a portal may correspond to an image of a product or service associated with the VR world, such as an advertisement for a product or service offered. In this way, banners, billboards, or other images may be introduced into a VR world, such as a service provider VR session or other VR world. It will be appreciated that portals in a VR session may take on any suitable shape or size. In some embodiments, a portal may be rendered similar to a window or door. In other embodiments, a portal may be rendered as a piece of art, a small object (e.g., a tablet or book), or on a surface of another object. It will be appreciated that some portals may not allow access for a user to connect to or enter the VR world associated with the portal, and may, therefore, correspond to a one-way or interactive display of supplemental content within the VR session. Optionally, such portals may provide a technique for allowing sponsoring of VR worlds or VR sessions, as the portals may correspond to a technique for advertising within a VR world or VR session.

In some embodiments, a user may exit or leave a particular remote VR session and return to a service provider VR container and/or reestablish a service provider VR session. Advantageously, this allows a user to move between unlinked, unconnected, or unrelated VR containers without having to completely exit from a VR session, meaning the user will not have to setup a new VR session or search for a particular new VR container to access and have to remove or take off their VR system. Optionally, a method of this aspect comprises or further comprises identifying input generated by the end user VR system corresponding to determination of an exit instruction for exiting the first remote VR container. Optionally, a method of this aspect comprises or further comprises establishing a fourth connection between the service provider VR container and the end user VR system, such as establishing a fourth connection that occurs in response to the exit instruction. Optionally, the fourth connection is associated with the service provider VR session. Optionally, detecting input generated by the end user VR system corresponding to determination of the second access instruction for accessing the second portal includes detecting input generated by the end user VR system within the service provider VR session corresponding to determination of the second access instruction for accessing the second portal. Optionally, facilitating establishing the third connection occurs while the service provider VR session is active. Optionally, methods of this aspect comprise or further comprise determining the second portal for accessing the second remote VR container from within the service provider VR session.

Various techniques may be employed to establish a remote VR session. For example, a direct connection between an end user system and a remote VR container may be established. Alternatively or additionally, a translation or transformation layer may exist between an end user system and a remote VR container to allow the end user system to establish a connection with the remote VR container. Such translation or transformation may be useful in circumstances, for example, where the end user system is incompatible, either completely or partially, with the remote VR container.

Optionally, facilitating establishing a connection includes transmitting information associated with a remote VR container to the end user VR system, such as information associated with the remote VR container that includes one or more of an address associated with the remote VR container, requirements and capabilities associated with the remote VR container, and a handshake protocol for establishing the connection with the remote VR container. Optionally, receiving the information associated with the remote VR container at the end user VR system causes the end user VR system to establish the connection with the remote VR container. Optionally, the end user VR system is compatible with the remote VR container.

Optionally, wherein facilitating establishing a connection includes receiving, from a content provider associated with a remote VR container, a VR container output stream, such as a VR container output stream that is at least partially incompatible with the requirements and capabilities of the end user VR system; transforming the VR container output stream to generate a transformed output stream, wherein the transformed output stream is compatible with the requirements and capabilities of the end user VR system; and transmitting the transformed output stream to the end user VR system. Optionally, transforming includes determining a first format of the VR container output stream; determining a second format compatible with the requirements and capabilities of the end user VR system; identifying a transformation protocol or algorithm for converting the first format to the second format; and converting the VR container output stream to the transformed output stream according to the transformation protocol or algorithm.

Optionally, facilitating establishing a connection includes receiving, from the end user VR system, an VR input stream, such as a VR input stream that is incompatible with a remote VR container; and transforming the VR input stream to generate a transformed input stream, such as a transformed input stream that is compatible with the remote VR container; and transmitting the transformed input stream to a content provider associated with the remote VR container. Optionally, transforming includes determining a first format of the VR input stream; determining a second format compatible with the remote VR container; identifying a transformation protocol or algorithm for converting the first format to the second format; and converting the VR input stream to the transformed input stream according to the transformation protocol or algorithm.

In another aspect, systems are provided herein, such as systems for performing methods relating to service provider enabled access to remote VR systems. In an embodiment, a system of this aspect comprises one or more processors; and a non-transitory computer readable storage medium in data communication with the one or more processors, the non-transitory computer readable storage medium including instructions that, when executed by the one or more processors, cause the one or more processors to perform any of the methods of the previously described aspect.

In another aspect, computer program products are provided herein, such as computer program products for performing methods relating to service provider enabled access to remote VR systems. In an embodiment, a computer program product of this aspect corresponds to a non-transitory computer readable storage medium comprising instructions that, when executed by one or more processors, cause the one or more processors to perform any of the methods of the previously described aspect.

In another aspect, methods are provided relating to establishing and using a registry of virtual containers. In some embodiments, a method of this aspect comprises instantiating, by a computing device, a registry of virtual containers, such as a registry that includes a plurality of entries. Optionally, each entry corresponds to a virtual container, and includes one or more of an identifier associated with the virtual container, a requirement associated with the virtual container, a constraint associated with the virtual container, and a characteristic associated with the virtual container. Optionally methods of this aspect may comprise or further comprise receiving, by the computing device, an addendum query for adding a new entry to the registry. Optionally, the addendum query includes one or more of an addendum identifier for the new entry, an addendum requirement for the new entry, an addendum constraint for the new entry, and an addendum characteristic for the new entry. Optionally, methods of this aspect may comprise or further comprise adding the new entry to the registry, such as a new entry that includes one or more of the addendum identifier, the addendum requirement, the addendum constraint, and the addendum characteristic. Optionally, methods of this aspect may comprise or further comprise receiving, by the computing device, a change query for modifying an existing entry in the registry, such as a change query that includes one or more of a new or changed identifier for the existing entry, a new or changed requirement for the existing entry, a new or changed constraint for the existing entry, and a new or changed characteristic for the existing entry. Optionally, methods of this aspect comprise or further comprise modifying the existing entry in the registry in include one or more of the new or changed identifier for the existing entry, the new or changed requirement for the existing entry, the new or changed constraint for the existing entry, and the new or changed characteristic. It will be appreciated that a virtual container optionally corresponds to a particular virtual reality world hosted on a network accessible server.

The registry of virtual containers may be useful for identifying VR containers based on a query, obtaining information about known VR containers, allowing users to add or modify entries to provide additional or supplemental information about VR containers known to the users, allowing VR containers to be associated with other VR containers and/or users, and identifying owners, registrants, creators, or copyright holders of VR containers and entries relating to VR containers, among other uses. Optionally a method of this aspect comprises or further comprises receiving, by the computing device, a query for identifying one or more virtual containers from the registry, such as a query includes at least one of an identifier query, a requirement query, a constraint query, and a characteristic query; determining, by the computing device, one or more query results, such as query results that correspond to entries in the registry having identifiers that match the identifier query, requirements that match the requirement query, constraints that match the constraint query, or characteristics that match the characteristic query; and generating, by the computing device, an output corresponding to the one or more query results. Optionally, the query corresponds to an initial filtering request for identifying one or more virtual containers accessible to a user. For example, the query may be used to identify VR containers compatible with a particular end user system or accessible using a particular end user system.

Various identifiers may be included in the different registry entries. Without limitation, an identifier may correspond to a name associated with the virtual container, an owner associated with the virtual container, a network address associated with the virtual container, a unique identifier associated with the virtual container, a domain associated with the virtual container, a version number associated with the virtual container, and a registrant associated with the virtual container.

Various requirements may be included in the different registry entries. It will be appreciated that, as used herein, the term requirements may refer to aspects needed to establish access with a VR container or to establish a VR session with a VR container. It will further be appreciated that different requirements may be met by employing a translation or transformation to provide compatibility with the requirements. Optionally, a requirement corresponds to access limitations imposed by the virtual container for obtaining access to the virtual container. Optionally, a requirement corresponds to hardware requirements associated with the virtual container and/or software requirements associated with the virtual container. Optionally, a requirement corresponds to indications of required user characteristics for obtaining access to the virtual container.

Various constraints may be included in the different registry entries. It will be appreciated that, as used herein, the term constraint may refer to aspects limiting access to a VR container. For example, a constraint optionally corresponds to limitations for receiving query results corresponding to the virtual container and for obtaining access to the virtual container. Optionally, a constraint corresponds to an age limit associated with the virtual container, a language associated with the virtual container, and/or a time limit associated with the virtual container.

Various characteristics may be included in the different registry entries. It will be appreciated that, as used herein, the term characteristics may provide descriptors about a VR container. Another term used, in embodiments, to describe a characteristic, may be the term "tag." Characteristics may be defined by a creator of a VR container, a host of a VR container, an owner of a VR container, or users of a VR container, for example. Optionally, a characteristic corresponds to a descriptor associated with the virtual container, an authentication indicator describing whether the virtual container requires authentication, indicators of permitted uses for the virtual container, an indicator of other virtual containers accessible from within the virtual container, and/or a language associated with the virtual container. Optionally, a characteristic may include identical content as identifiers, requirements, and/or constraints. That is, identifiers, requirements, and/or constraints may be listed as characteristics as well. Advantageously, characteristics may be optional items included in a registry entry that may be different from entry to entry. For example, certain types of characteristics may not be required for every entry but may be available if certain containers make use of it. For example, a characteristic describing an authentication requirement may be a useful characteristic that is employed by at least a portion of the entries. Optionally, the characteristic corresponds to one or more portal representations for use in representing an entry point to the virtual container. Characteristics may also include ratings, such as user ratings, which may be employed as a crowd-sourced authentication of a particular entry. Characteristics may also include a digital signature, allowing users to verify the authenticity of a particular entry as being owned, published, hosted, created, etc., by a particular entity, such as a company, user, publisher, etc.

In embodiments, a plurality of entries are organized in the registry in a hierarchical structure. For example, the hierarchical structure optionally includes a plurality of top-level items, each associated with a particular virtual container identifier or characteristic. Example top-level items may correspond to a high-level grouping of VR containers, such as a grouping that all relate to a particular topic, a particular registrant, a particular owner, a particular publisher, etc. Optionally, each top-level item includes a plurality of entries organized beneath the top-level item, such as a plurality of entries that each relate to the particular virtual container identifier or characteristic associated with the top-level item. Optionally, each top-level item includes one or more second-level item organized beneath the top-level item, such as one or more second-level items that each relate to different characteristics. Optionally, each second-level item includes a plurality of entries organized beneath the second-level item, such as a plurality of entries that each relate to the characteristic associated with the second-level item.

Such an organization may be similar to the organization of domain names in the DNS system. Optionally, the registry makes use of a domain name server structure. It will be appreciated that in the DNS system, the top-level domain may be controlled by a particular entity, such as how the .COM top-level domain is administered by Verisign. In the registry associated with the methods of this aspect, a particular top-level item may relate to a particular identifier or characteristic. An example, described below, is a top-level item corresponding to libraries. Each entry organized under the library top-level item would be expected to relate, at least in some way, to libraries.

In another aspect, systems are provided herein, such as systems for performing methods relating to establishing and using a registry of virtual containers. In an embodiment, a system of this aspect comprises one or more processors; and a non-transitory computer readable storage medium in data communication with the one or more processors, the non-transitory computer readable storage medium including instructions that, when executed by the one or more processors, cause the one or more processors to perform any of the methods of the previously described aspect.

In another aspect, computer program products are provided herein, such as computer program products for performing methods relating to establishing and using a registry of virtual containers. In an embodiment, a computer program product of this aspect corresponds to a non-transitory computer readable storage medium comprising instructions that, when executed by one or more processors, cause the one or more processors to perform any of the methods of the previously described aspect.

In another aspect, methods are provided for facilitating access to supplemental content with a VR container. In an embodiment, a method of this aspect comprises receiving, by a computing device, a first request for access to a virtual reality (VR) container from a first end user VR system; establishing a first network connection with the first end user VR system; using the first network connection to facilitate access by the first end user VR system to data for rendering output corresponding to the VR container; receiving a second request for access to the VR container from a second end user VR system; establishing a second network connection with the second end user VR system; using the second network connection to facilitate access by the second end user VR system to data for rendering output corresponding to the VR container; receiving a third request for access to a supplemental content stream within the VR container; using the first network connection to facilitate access by the first end user VR system to the supplemental content stream; using the second network connection to facilitate access by the first end user VR system to the supplemental content stream. Optionally, the supplemental content stream comprises one or more of a user source content stream generated by an end user VR system, a data stream associated with a second VR container, an audio stream, a video stream, a text stream, metadata associated with an end user VR system, metadata associated with the VR container, or accessibility data.

Optionally, the third request includes one or more preferences or permissions associated with the first end user VR system or the second end user VR system, which may allow customized supplemental content to be provided to a particular end user VR system, which may be different than the supplemental content provided to another particular end user VR system. As an example, the supplemental content may correspond to a translation of content within the VR container and different translations may be provided to different end user VR systems. Accessibility features may also be provided in a similar way.

In embodiments, the supplemental content stream comprises supplemental audio information overlaid on an audio stream associated with the VR container or wherein the supplemental content stream comprises supplemental video information overlaid on a video stream associated with the VR container. Optionally, facilitating access to the supplemental content stream comprises obtaining the supplemental content stream and transmitting the supplemental content stream or data derived from the supplemental content stream. Optionally, facilitating access to the supplemental content stream comprises including at least a portion of the supplemental content stream in the data for rendering output corresponding to the VR container. Accordingly, a VR session may have supplemental content from another source added to the VR session. Such addition may occur by a provider of the VR container or at an end-user system. Optionally, facilitating access to the supplemental content stream comprises transmitting a network address for a remote server that provides the supplemental content stream. Such communication of a network address may allow an end-user system to obtain the supplemental content directly from the remote server.

Optionally, the supplemental content stream comprises a user source content stream generated by an end user VR system. In this way, content provided by, generated at, or otherwise obtained by an end user VR system may be shared with the VR container and/or other end user VR systems. For example, a method of this aspect may further comprise receiving a first user source content stream transmitted by the first end user VR system. Optionally, a user source content stream includes one or more of an audio stream obtained by an end user VR system, a video stream obtained by an end user VR system, a text stream obtained by an end user VR system, VR container position data associated with the an end user VR system, a preference associated with an end user VR system, a permission associated with an end user VR system, or metadata associated with an end user VR system. Optionally, at least a portion of the first user source content stream is transmitted to the second end user VR system, such as in a VR session or as a secondary content stream. Optionally, a network address of the first end user VR system may be transmitted to the second end user VR system to facilitate the second end user VR system obtaining at least a portion of the first user source content stream. Such information may allow the first user source content stream to be obtained directly by the second end user VR system from the first end user VR system. Optionally, a network address of the second end user VR system may be transmitted to the first end user VR system to facilitate the first end user VR system providing at least a portion of the first user source content stream to the second end user VR system. In some embodiments, however, the supplemental content is not a user source content stream or comprises or is another content stream other than a user source content stream, such as a content stream generated or otherwise provided by a remote server and not an end user VR system.

Optionally, facilitating access to data for rendering output corresponding to the VR container comprises transmitting a VR container output stream. For example, facilitating access to data for rendering output corresponding to the VR container may optionally further comprise generating the VR container output stream. Optionally, wherein facilitating access to data for rendering output corresponding to the VR container comprises transmitting an instruction set for directly generating a VR container output stream by an end user VR system. Optionally, facilitating access to data for rendering output corresponding to the VR container comprises transmitting a network address for a remote server that provides a VR container output stream or that provides an instruction set for directly generating a VR container output stream by an end user VR system. By facilitating access to data for rendering output corresponding to the VR container, an end user VR system may directly generate a VR container output stream, a server corresponding to the VR container may generate the VR container output stream, or a service provider VR session or other intermediate server or session may generate the VR container output stream in a format compatible with an end user system.

In another aspect, systems are provided herein, such as systems for performing methods relating to facilitating access to supplemental content within a VR container. In an embodiment, a system of this aspect comprises one or more processors; and a non-transitory computer readable storage medium in data communication with the one or more processors, the non-transitory computer readable storage medium including instructions that, when executed by the one or more processors, cause the one or more processors to perform any of the methods of the previously described aspect.

In another aspect, computer program products are provided herein, such as computer program products for performing methods relating to facilitating access to supplemental content within a VR container. In an embodiment, a computer program product of this aspect corresponds to a non-transitory computer readable storage medium comprising instructions that, when executed by one or more processors, cause the one or more processors to perform any of the methods of the previously described aspect.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 4 provides a schematic illustration of a portion of an example registry of virtual containers.

DETAILED DESCRIPTION

Figure 1:
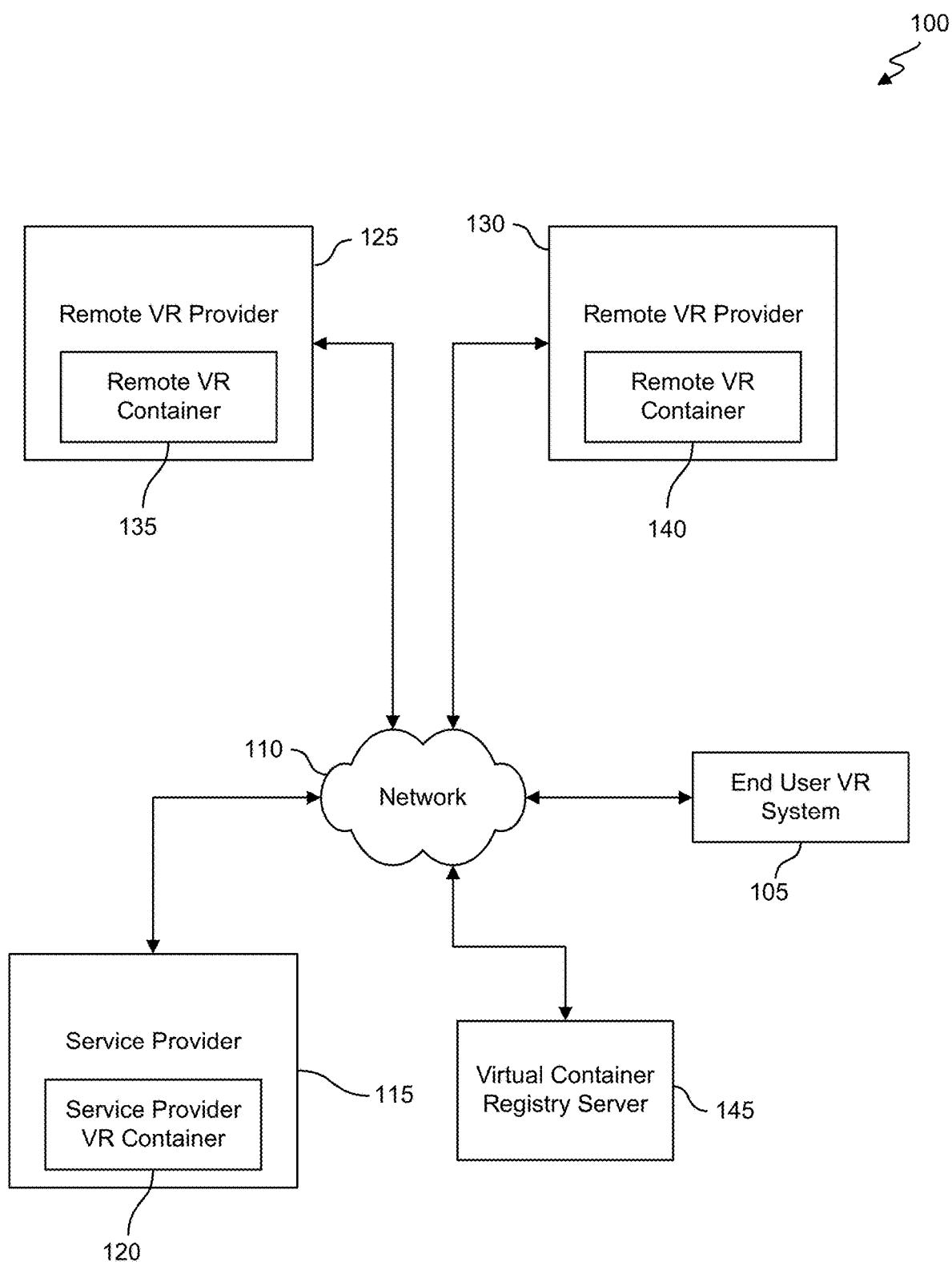
FIG. 1 illustrates an embodiment of a network.

In embodiments, the present invention provides systems, methods, and computer program products for facilitating end user access to virtual reality worlds and, optionally, obtaining supplemental content (e.g., external content) within a virtual reality world. As used herein, the terms virtual world, virtual reality world, virtual container, virtual reality container, virtual experience, virtual reality experience, virtual environment, virtual reality environment, and the like interchangeably refer to a software or computer generated environment including images and/or sounds to simulate a user's presence in a physical environment, which may represent a real place in the universe, such as a place on Earth or the moon, or may represent a fictional world. Typical outputs for a virtual reality world include, but are not limited to, a visual representation of a virtual world and an audio representation of a virtual world. A visual representation may include text or other information, which may, at least in part, overlap with or be representative of an audio representation. Similarly, an audio representation may include audio information that, at least in part, overlaps or is representative of information included in a video representation. Other output, such as tactile or haptic feedback may be generated for sensation by a user. In some virtual worlds, the laws of physics are set to match those of reality, while in other virtual worlds, the laws of physics may be modified or otherwise differ from reality. Input to a virtual container may represent a user's position, orientation, point of view and interactions with the virtual world. A user may also provide user source content as input to a virtual container, which may represent audio and/or video generated by the user, such as audio obtained from an end user virtual reality system or video information obtained by a video capture device associated with the end user virtual reality system.

It will be appreciated that the software or computer generating the virtual environment may be remote from the end user, and outputs representing the virtual environment may be transmitted to an end user virtual reality system, such as over one or more wired or wireless network links. It will also be appreciated that the software or computer generating the virtual environment may be co-located with an end user and, for example, may be present within, as part of, or in data communication with an end-user virtual reality system, such as a headset. In some embodiments, a virtual environment may be provided by a remote server as an executable or program instructions, which may be referred to as a kernel. The executable or program instructions may be performed or otherwise executed by an end-user system to provide outputs, such as visual, audio, haptic, and/or tactile outputs to a user. In some embodiments, the executable or program instructions may be performed or otherwise executed by an intermediate system between the end-user virtual reality device or system and the remote server, such as a service provider system, to provide outputs for use by an end user system. It will be appreciated that, in some embodiments, the executable or program instructions may be provided on a non-transitory computer readable storage medium, such as a flash drive, a CD, a DVD, etc. Optionally, the executable or program instructions may be included in one or more data transmissions over a network and stored to a non-transitory computer readable storage medium local to an end user virtual reality system.

FIG. 1 provides a schematic illustration of a network environment 100. Here, an end-user VR system 105 connects to a network 110. In some embodiments, the network 110 may allow devices to establish a bi-directional communication path for data transfer between the devices. The network 110 is intended to represent any number of terrestrial and/or non-terrestrial network features or elements. For example, the network 110 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, and/or any other type of communication network(s) configured such that data may be transferred between and among respective elements of the network environment 100.

Network environment 100 also includes a service provider 115, which may host or otherwise provide or include a service provider virtual reality container 120. Service provider 115 may act, in some embodiments, as an intermediary between end user system 105 and one or more other remote VR providers 125 and 130, which may in turn respectively host or otherwise provide or include remote virtual reality containers 135 and 140.

Network environment 100 also includes a virtual container registry server 145. Virtual container registry server 145 may create, host or otherwise provide or include a registry of virtual containers. It will be appreciated that virtual container registry server 145 may be a part of or included in service provider 115, or another entity, server, or device in communication with network 110. Virtual container registry server may allow for creation or modification of entries in a registry of virtual containers. A registry of virtual containers may be replicated, in whole or in part, on other devices or servers in communication with network 110. A registry of virtual containers may exist as a distributed system or database on multiple servers in communication with network 110, and may parallel, for example, aspects of a domain name system, where updates to a registry may propagate from server to server.

Figure 2:
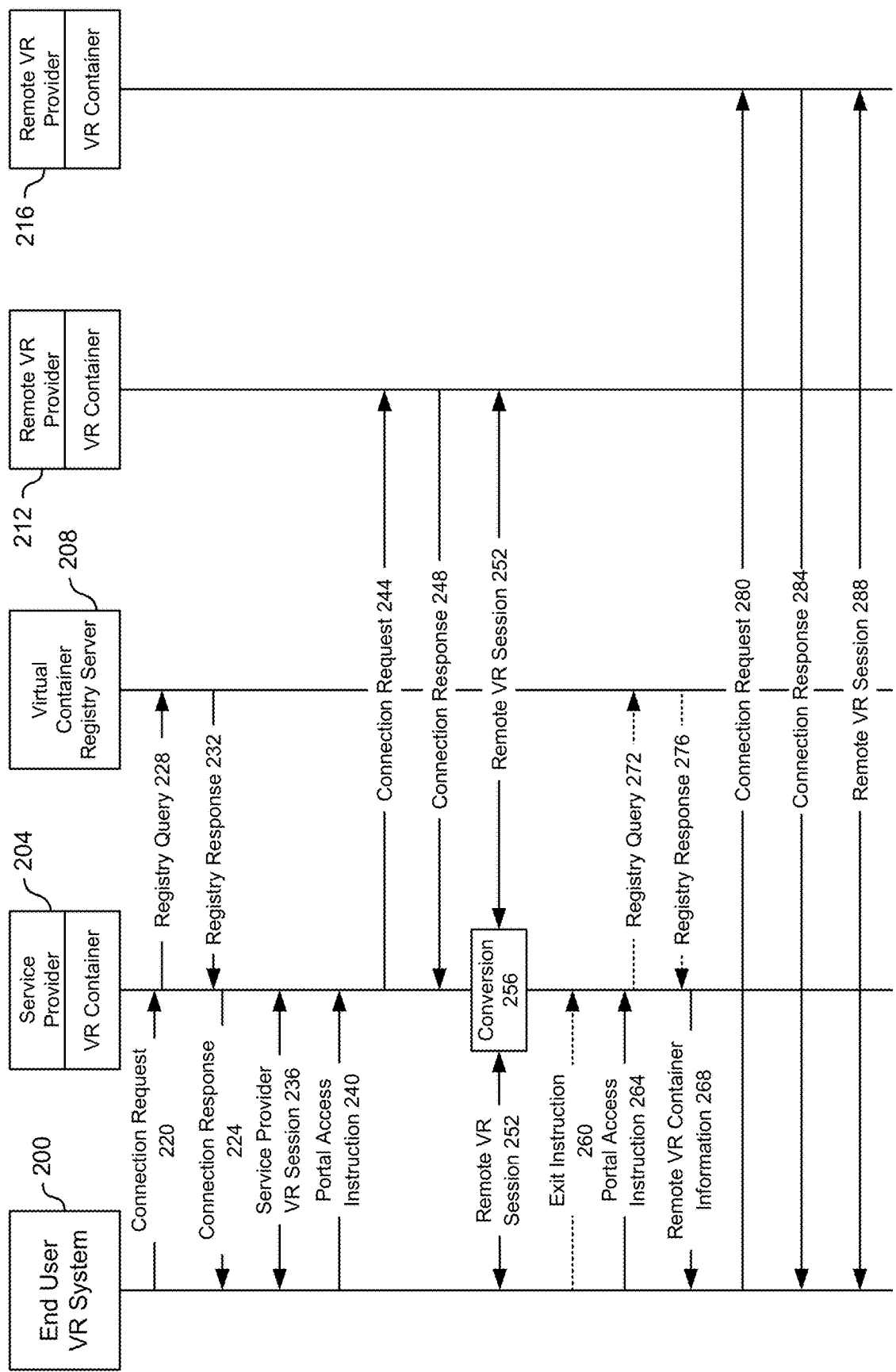
FIG. 2 provides a schematic illustration of communications between devices.

FIG. 2 provides a schematic illustration of communications between different devices, which may be included in network environment 100. For example, FIG. 2 shows communications between an end user VR system 200, a service provider 204, a virtual container registry server 208, and remote VR providers 212 and 216.

End user system 200 may transmit a connection request 220 to service provider 204, such as a request to establish a VR session. Service provider 204 may respond with a connection response 224. Optionally, service provider 204 may transmit a registry query 228 to virtual container registry 208 to query a registry of virtual containers for one or more remote VR containers that may be available or accessible to end-user system 200. Registry query 228 may include information about end-user system 200 and/or a user associated with end-user system, such as credentials, tokens, or characteristics of end-user system 200 or the user. Virtual container registry server 208 may generate a registry response 232, which may be received by service provider 204 and may include identifiers, portal information, or other useful information about remote VR containers or how to establish a VR session with a remote VR container.

Connection request 220 and connection response 224 may represent a handshake between end user system 200 and service provider 204 for establishing a service provider VR session 228, representing entry of a user into a VR container of service provider 204. Service provider VR session 228 may represent bidirectional communication between end user VR system 200 and service provider 204, also referred to herein as a network connection. The service provider VR session 236 may allow a virtual world accessible by end-user VR system 200 to include one or more portals representing entry points to remote VR containers.

End user system 200 may transmit a portal access instruction 240 to service provider 204, representing a request to enter a particular remote VR container, such as a VR container associated with remote VR provider 212. In response to the portal access instruction 240, service provider 204 may, for example, transmit a connection request 244 to remote VR provider 212, such as a request to establish a VR session. Remote VR provider 212 may respond with a connection response 248. Connection request 244 and connection response 248 may represent a handshake between end user system 200, via service provider 204, and remote VR provider 212 for establishing a remote VR session 252. Optionally, service provider 204 may perform a conversion 256 of aspects of remote VR session 252, such as when end user system 200 is at least partially incompatible with the VR container of remote VR provider 212.

In some embodiments, a user may wish to move from the remote VR session 252 to another remote VR container, and so end user system 200 may optionally transmit an exit instruction 260 and transmit another portal access instruction 264. It will be appreciated that portal access instruction 264 may be transmitted while remote VR session 252 is active or upon termination of remote VR session 252. In some embodiments, termination of remote VR session 252 results in end user VR system 200 and service provider 204 re-establishing service provider VR session 236 or establishing a new service provider VR session.

In some embodiments, end user system 200 may be compatible with a remote VR container, such as a VR container associated with remote VR provider 216. In these and other circumstances, service provider 204 may transmit remote VR container information 268 to end user system 200 in response to a portal access instruction 264. Remote VR container information 268 may include instructions or information on how to contact or establish a VR session with remote VR container 216. Optionally, service provider 204 may transmit a registry query 272 and receive a registry response 276 to obtain some or all of the information included in remote VR container information 268.

To establish a VR session, end user system 200 may transmit a connection request 280 to remote VR provider 216. Remote VR provider 216 may respond with a connection response 284. Connection request 280 and connection response 284 may represent a handshake between end user system 200 and remote VR provider 216 for establishing a remote VR session 288.

It will be appreciated that FIG. 2 merely provides one example of how connections may be established for VR sessions and how communications may be exchanged between devices. Other variations on the communications illustrated in FIG. 2 will be appreciated in view of the contents of the figure and the above description, such as where connection requests and responses for different remote VR sessions occur in different orders, or where conversions may or may not take place, or where direct connections between end user system 200 and a remote VR provider may take place.

Figure 3:
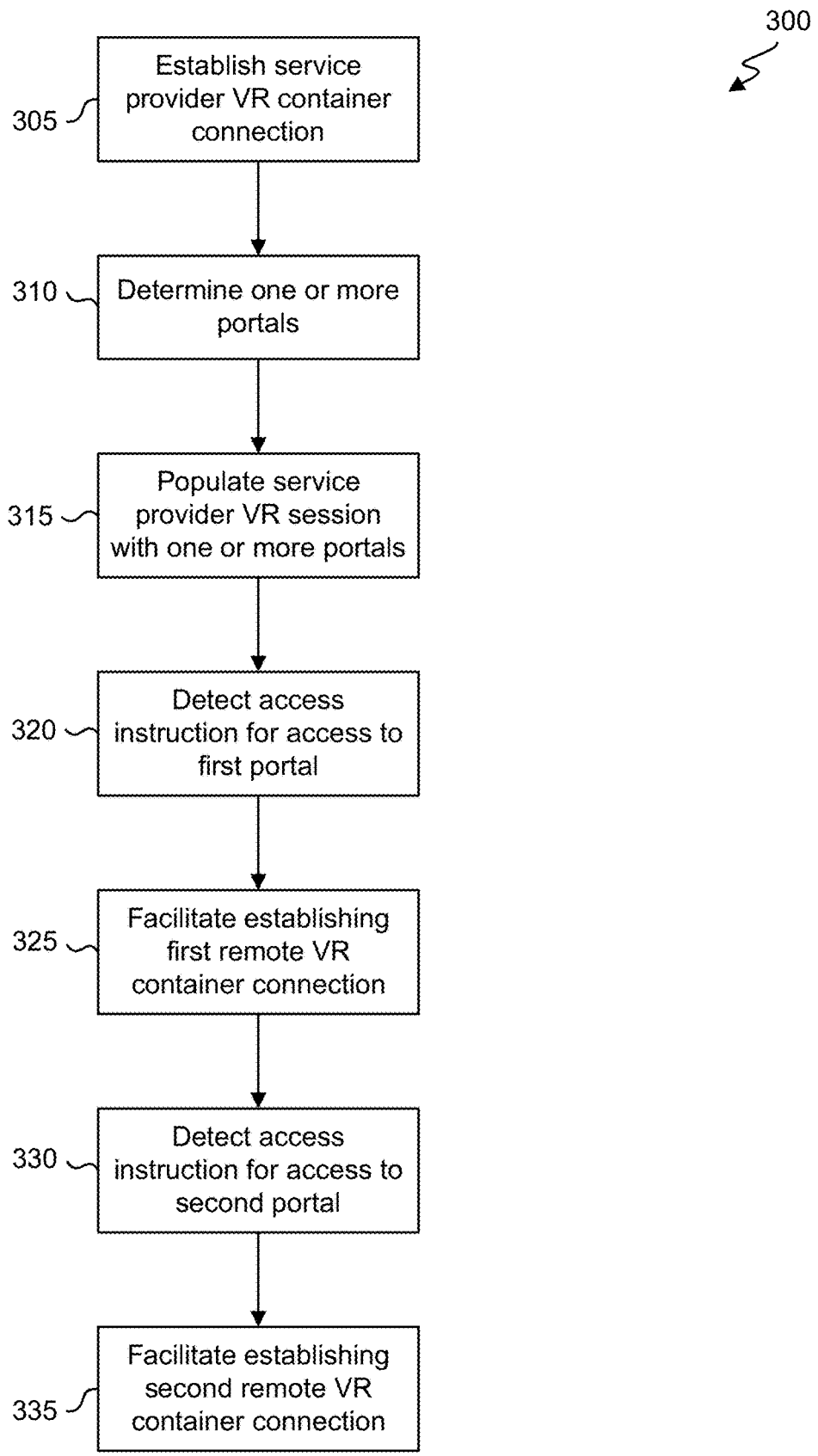
FIG. 3 provides an overview of a method for providing access to remote VR systems in accordance with some embodiments.

FIG. 3 provides an overview of an example method 300, which may be performed, for example, by a service provider or service provider server. At block 305, a service provider VR container connection is established. At block 310, one or more portals are determined. At block 315, the service provider VR session is populated with the one or more portals. At block 320, an access instruction for access to a first portal is detected. At block 325, a first remote container connection is established or facilitated. At block 330, an access instruction for access to a second portal is detected. At block 335, a second remote container connection is established or facilitated.

FIG. 4 provides a schematic illustration of portion of an example registry 400 of virtual containers 400. Registry 400 of virtual containers includes multiple entries, each represented as individual rows 405-440 in FIG. 4. Registry 400 may correspond to or comprise a database, for example. Columns in FIG. 4 represent different components of each entry and example components such as an identifier, a requirement, a constraint, and a characteristic are illustrated.

Registry 400 of virtual containers may be organized in a hierarchical fashion. For example, row 410 may represent a top level item of the registry. Rows 405 and 425 may be organized such that they exist as second level items beneath the top level item of row 410. This organization may not represent the physical organization of data in registry 400, but may represent relationships between different entries in the registry. Row 415 may represent a third level item organized beneath second level item, such as row 405. Similarly, row 430 may represent a third level item organized beneath second level item, such as row 425. It will be appreciated that the organization of items in a hierarchical structure may allow related items to be grouped together in the hierarchy. In some embodiments, items in registry 400 may be below to different hierarchies simultaneously.

It will be appreciated that identifiers shown in registry 400 are merely example names identifying a particular VR container. Any number of identifiers may be included in an entry. Other identifiers may be useful, such as a domain name, an Internet or IP address, a publisher, etc.

It will be appreciated that requirements shown in registry 400 are merely examples. Any number of requirements may be included in an entry. When a requirement of "any" is show, this may indicate that the VR container may be compatible with any VR system, such as by the container providing output dynamically depending on a particular VR system. In row 420, for example, the History World container is depicted as requiring a particular operating system, such as a version of Android greater than or equal to 5 or a version of iOS greater than or equal to 7. Rows 435 and 440 illustrate that only particular systems are supported by those virtual containers, namely the Oculus Rift system and the Sony PlayStation VR system.

It will be appreciated that constraints shown in registry 400 are merely examples. Any number of constraints may be included in an entry. In row 420, History World is shown as having a constraint of the English language, indicating that users not supporting English may not be permitted entry into History World, and that a password may also be required to obtain entry. Rows 435 and 440 illustrate age constraints, indicating that between the hours of 3 and 9 pm, an age limit of 13 or greater is required for entry, and an age of 18 or greater is required for entry at all other times.

It will be appreciated that the characteristics shown in registry 400 are merely examples. Any number of characteristics may be included in an entry, and characteristics may be flexible for indicating any type of other information relating to a particular VR container. For example, characteristics may identify linked VR containers. Characteristics may identify users associated with a VR container. Characteristics may identify ratings associated with a VR container. Characteristics may identify that advertisements are shown in a VR container. Characteristics may identify that a VR container represents a shopping or commerce container. Other characteristics are possible.

Figure 5:
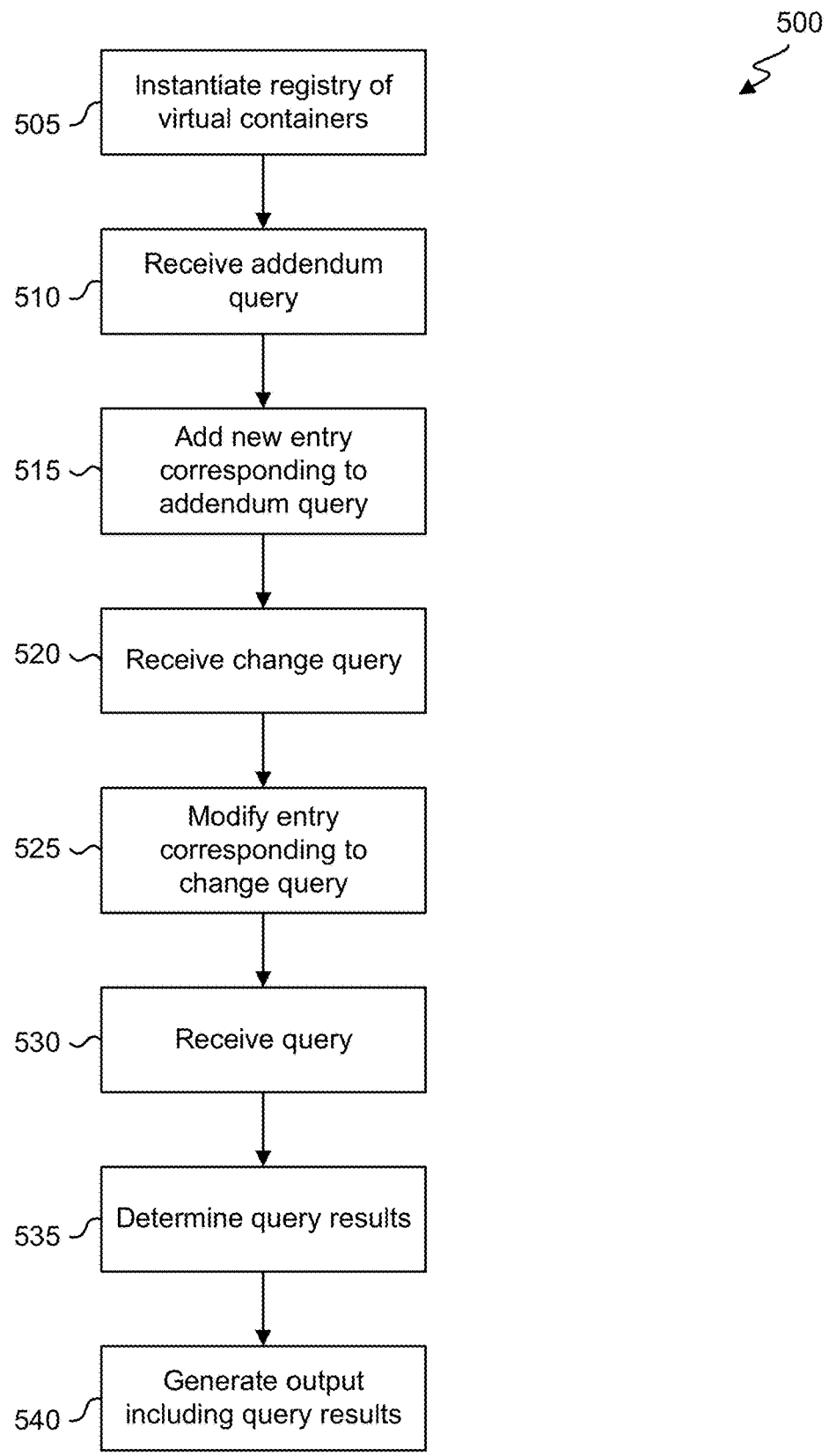
FIG. 5 provides an overview of a method for creating and using a registry of virtual containers in accordance with some embodiments.

FIG. 5 provides an overview of an example method 500 for creating and using a registry of virtual containers. At block 505, a registry of virtual containers is instantiated. At block 510 and addendum query is received. At block 515 a new entry corresponding to the addendum query is added to the registry of virtual containers. At block 520, a change query is received. At block 525 an entry is modified based on the change query. At block 530 a query is received, such as an information query. At block 535, query results are determined. At block 540 output including the query results are generated. Other queries are possible, including deletion queries for deleting an entry from the registry of virtual containers.

It will be appreciated that a content provider or content provider system, may use aspects of FIG. 5 to publish changes relating to their VR containers to a registry. For example, a content provider or content provider system may wish to update, add, lock, or delete one or more registry entries. A registry entry, for example, may have an associated authentication token to identify a controlling entity that may make changes or delete the registry entry. In this way, an entity may be able to control changes to the registry entry.

As an example of a VR container that may show various aspects of the features and techniques described herein, an end user may wish to host and/or participate in a virtual event, such as a sporting event viewing party, which may optionally relate to a real world sporting event (such as a Superbowl party) or may relate to a virtual event. Various scenarios of a virtual container for such a virtual event are contemplated, including a user-hosted container, a service-provider hosted container, a broadcaster or sponsor hosted container, etc. Such a virtual container may be listed in a registry of virtual containers, as described above, to facilitate end users locating and accessing the virtual container. Such a virtual container may be publicly accessible or accessible only to users meeting appropriate constraints (e.g., permissions, authentication, etc.). For each of the hosting scenarios, common features may apply, as some end users accessing the virtual container will be remote and accessing the virtual container over a network connection.

Figure 6:
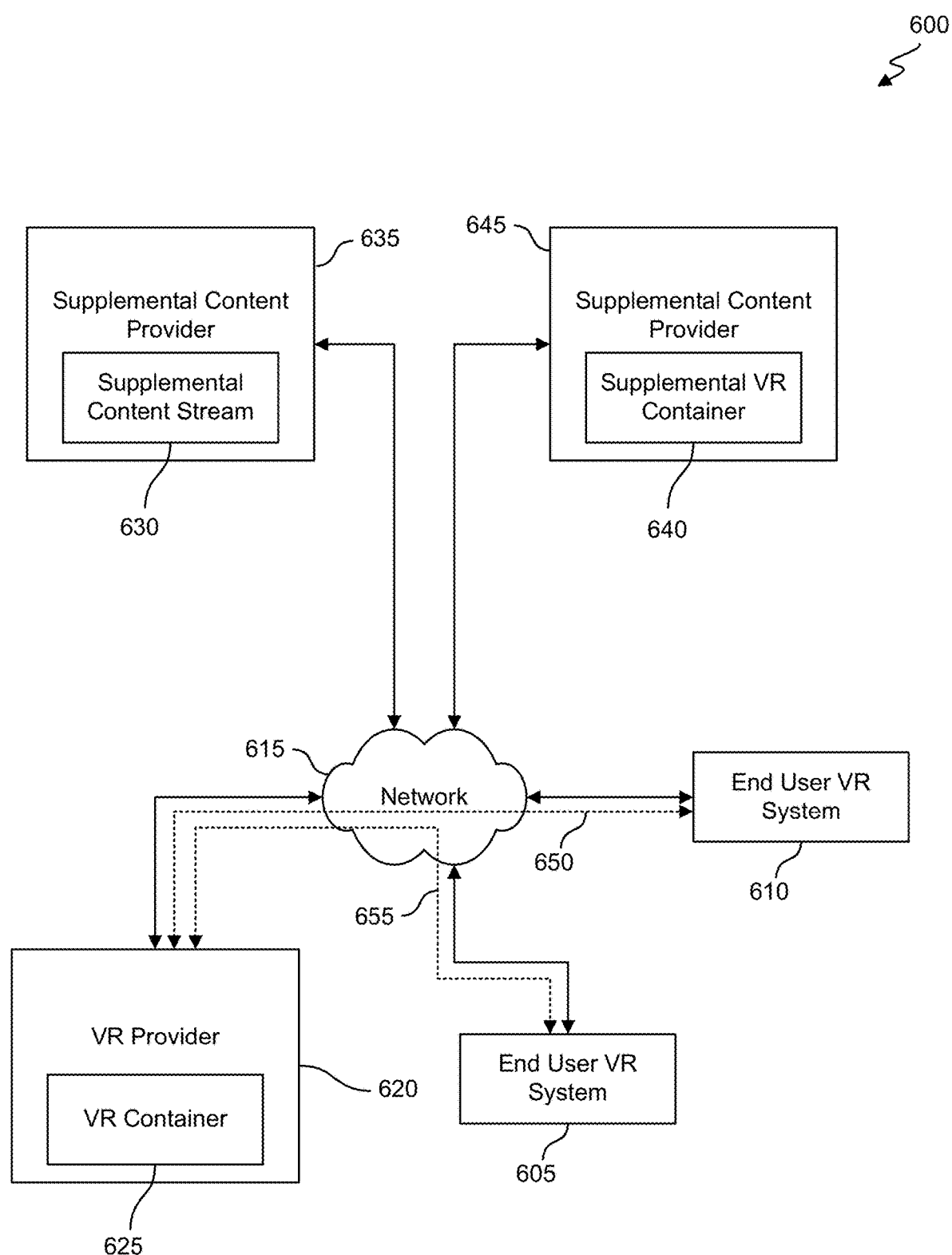
FIG. 6 illustrates an embodiment of a network.

FIG. 6 illustrates an embodiment of a network environment 600. It will be appreciated that network environment 600 may overlap or share, at least in part, components or aspects with network environment 100 described above with respect to FIG. 1. In FIG. 6, a first end user VR system 605 and a second end user VR system 610 each connect to a network 615. In some embodiments, the network 615 may allow devices to establish a bi-directional communication path for data transfer between the devices. The network 615 is intended to represent any number of terrestrial and/or non-terrestrial network features or elements. For example, the network 615 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, and/or any other type of communication network(s) configured such that data may be transferred between and among respective elements of the network environment 600.

Network environment 600 also includes VR provider 620, which may host or otherwise provide or include a virtual reality container 625. As described above, VR provider may be user hosted, hosted by a service provider, hosted by a broadcaster, etc. VR provider 615 may optionally be associated with or directly connected to or as part of an end user VR system, which may be different from end user VR systems 605 and 610.

With respect to the example virtual event described above, VR container 625 may correspond to the sporting event viewing party, and may be, for example, a virtual reality world constructed as a living room to allow end users associated with end user VR systems 605 and 610 to simultaneously participate in viewing the sporting event. As an example, the sporting event may be provided in the VR container as a window or portal exhibiting a display of a broadcast, stream, or video transmission of the sporting event. Such a scenario will be appreciated as representative of content commonly available as a two or three-dimensional video in the real world as viewed, for example, on a television display, but other embodiments are contemplated, such as where the event or content being commonly shared or viewed by participating end users corresponds to a virtual reality experience of another virtual reality container.

VR provider 625 may establish network connections 650 and 655 with end user VR systems 605 and 610 in order to establish VR sessions and provide data streams to end user VR systems 605 and 610 in order for VR systems 605 and 610 to render output corresponding to VR container 625. Such a data stream may be or include, for example, an instruction set for use by end user VR systems 605 or 610, an audio stream, a video stream, a text stream, metadata, tactile data, and the like for directly outputting or converting for output by end user VR systems 605 and 610. In the sporting event viewing party described above, the VR sessions established between VR provider 625 and end user VR systems 605 and 610 may allow end users to view, listen to, interact with, and/or otherwise experience the living room with a window or portal displaying the broadcast of the sporting event. Network connections 650 and 655 may be provided by way of network 615 and may include transmission control protocol (TCP) connections over a packed switched network, for example.

End users system 605 and 610 may be able to apply or provide preferences and permissions to enable customization of the VR container, as desired. For example, an end user system may identify preferences for colors of a particular sports team to be included in the décor of the virtual living room. An end user system may also identify accessibility features that are to be activated in output presented at the end user system.

End user systems 605 and 610 may each provide a user source content stream to other devices in network environment 600. For example, end user systems 605 and 610 may provide audio streams corresponding to audio captured by a microphone of end user systems 605 and 610. Such a user source content stream may be provided, for example, between an end user system and VR provider 620, such that VR provider 620 may include a portion (e.g., audio) from the user source content stream as part of VR container 625. Optionally, user source content streams may be directly communicated from one end user VR system to another. VR provider 620 may facilitate such an exchange, such as by providing network address information for one or more end user VR systems 605 or 610 and/or other information allowing end user VR systems 605 or 610 to exchange data with one another via network 615.

Depending on the configurations, permissions, and preferences associated with end user systems 605 and 610 and VR container 625, transformation of the user source content stream may take place. As examples, audio in a user source content stream may be translated from one language to another, may be converted to text or a video description, may be filtered, or may be amplified or curtailed, etc. Similarly, in the case where user source content stream includes video or graphical information, the video or graphical information may be converted to another format, turned into an audio or text description, converted into alternative color space, filtered, etc. In this way, users with different preferences or permissions may be adapted, such as to allow users speaking different languages to communicate with one another or to accommodate users that require accessibility (e.g., blind, low vision, deaf, or hard of hearing users). User preferences may be applied or not, depending on the context and configuration. The transformation of user source content streams may occur at one or more devices of network environment 600, such as an end user system 605 or 610 or VR provider 620.

Other remote devices, such as supplemental content provider 635 or 645 may also provide for transformation of user source content streams. For example, supplemental content provider 635 may represent a virtual or network transformation service provider. A data stream, such as a user source content stream, may be received at supplemental content provider 635, which then transforms the received data stream to a supplemental content stream 630, which may then be provided, for example to VR provider 620, such as for inclusion as part of VR container 625, or directly to an end user VR system 605 or 610.

Turning back to the example event of a sporting event viewing party, as described above, a window or portal may be included in VR container 625 to allow participating end users to view a video of the sporting event. Such a broadcast may optionally correspond to supplemental content added to the VR container 625. Optionally, one or more end users may provide the video as a supplemental content. Optionally, VR provider 620 may directly provide or obtain the video as a supplemental content, such as in response to a request for supplemental content received from one or more end user VR systems.

In some embodiments, a supplemental content provider 635 may provide the video as supplemental content stream 630. Optionally, VR provider may communicate a request to supplemental content provider 635 for the supplemental content stream 630 corresponding to the video to be displayed in the window or portal within VR container 625. Optionally, an end user VR system 605 or 610 may communicate a request for the video, which may be received at VR provider 620 and relayed to supplemental content provider 635 or directly communicated to supplemental content provider 635. Optionally, the supplemental content provider 635 may provide supplemental content 630 directly to end user VR systems 605 or 610, and such a configuration may be facilitated by VR provider, such as by VR providing one or more network addresses of devices in network environment 600 to one another. It will be appreciated that the video of the sporting event to be displayed in the window or portal within VR container 625 is merely one example of a supplemental content added to VR container 625. As examples, audio content, video content or graphical content, text content, haptic content, and virtually any other kind of data or information may be useful supplemental content to be added to VR container 625. Other examples are possible, including, as described above, a transformation of a user source content stream. In the context of the sporting event viewing party, a user may wish to receive fantasy sports league information and may request such information from a fantasy sports league provider, corresponding to supplemental content provider 635. The fantasy sports league information may be provided as supplemental content stream 630 and may, for example correspond to text, audio, video and/or graphical information that is added to VR container 625, or rendered as output by end user VR system 605 or 610, such as overlaid on the output corresponding to VR container 625.

Still other examples of supplemental content are possible, including content from a supplemental VR container, such as supplemental VR container 640 provided by supplemental VR provider 645. In this way, virtually any kind of information or content may be added to VR container 625, such as by VR provider 620 or directly by an end user system 605 or 610. As an example with respect to the sporting event viewing party described above, the supplemental VR container 640 may correspond to a virtual world representing the arena in which the sporting event is taking place. A representation of the arena may be added to or included in the living room associated with VR container 625, allowing a user that, for example, enters a door within the living room to explore and/or otherwise experience the arena in a virtual setting. Such a representation may be provided as a portal to supplemental VR container 640 or by modifying VR container 625 directly to include the features provided by supplemental VR container.

Figure 7:
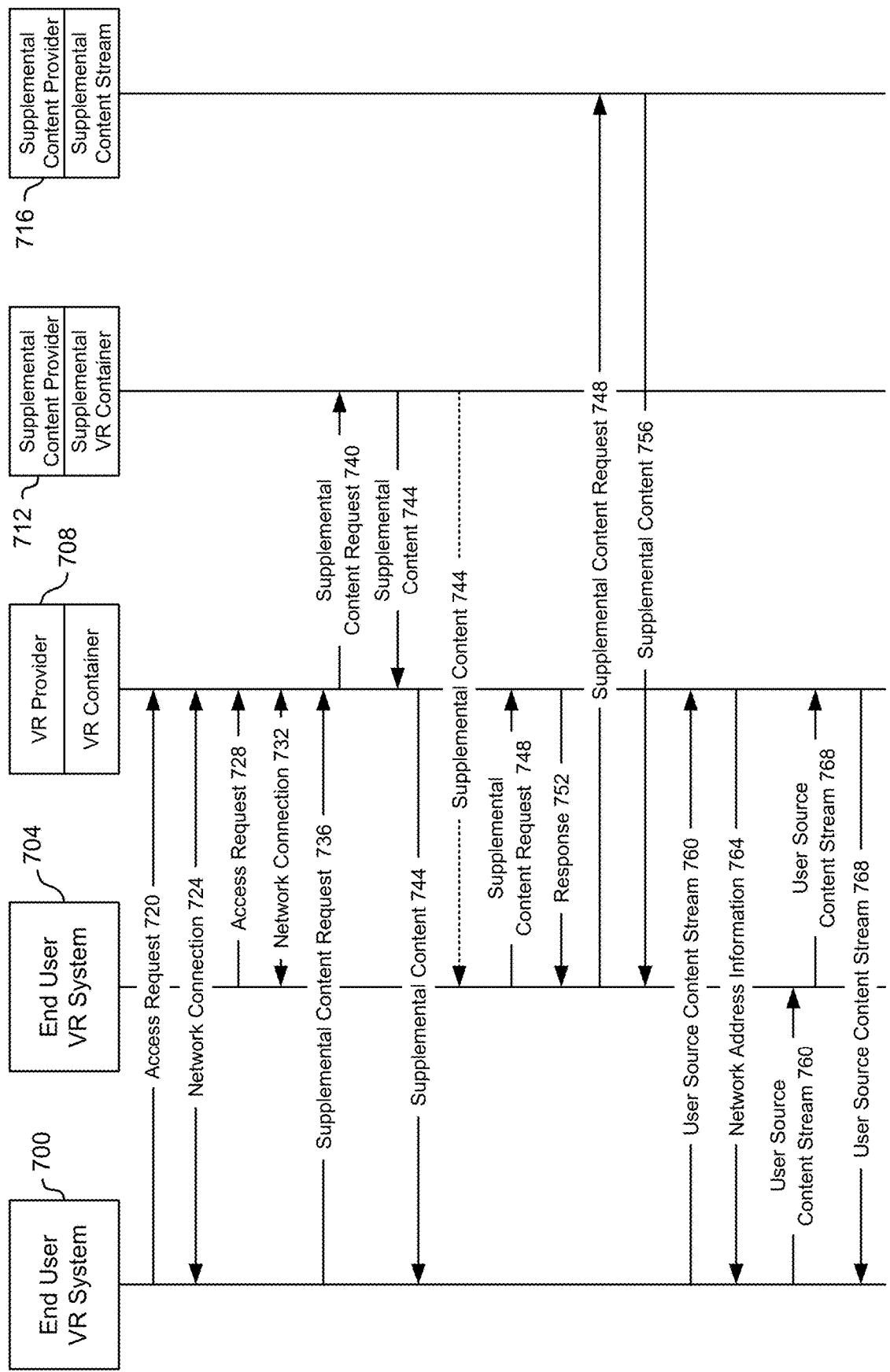
FIG. 7 provides a schematic illustration of communications between devices.

FIG. 7 provides a schematic illustration of communications between different devices, which may be included in network environment 600. For example, FIG. 7 shows communications between end user VR systems 700 and 704, a VR provider 708, and supplemental content providers 712 and 716.

End user VR system 700 may transmit an access request 720 to VR provider 708, such as a request to establish a VR session. VR provider 708 may establish a network connection 724 with end user VR system 700, which may correspond, at least in part with a VR session. Similarly, end user VR system 704 may transmit an access request 728 to VR provider 708, such as a request to establish a VR session. VR provider 708 may establish a network connection 732 with end user VR system 700, which may correspond, at least in part with a VR session. It will be appreciated that access or communications may optionally be exchanged with a virtual container registry to enable establishment of a VR session. It will also be appreciated that one or more later communications between end user VR system 700 and VR provider 708 may be transmitted using network connection 724 and that that one or more later communications between end user VR system 704 and VR provider 708 may be transmitted using network connection 732. With respect to the virtual sporting event viewing party described above, these aspects may correspond with end user VR systems 700 and 704 establishing VR sessions with the virtual living room so that the end users can participate in the sporting event viewing party.

End user VR system 700 may transmit a supplemental content request 736 to VR provider 708. In response to the supplemental content request 736, VR provider 708 may transmit a supplemental content request 740 to supplemental content provider 712, which may provide supplemental content 744 to VR provider. VR provider 708 may then relay or facilitate supplemental content 744 being provided to end user VR system 700 and, optionally, to end user VR system 704. As illustrated, VR provider 708 transmits supplemental content 744 to end user VR system 700, while supplemental content provider 712 transmits supplemental content 744 directly to end user VR system 704. As an example for the virtual sporting event viewing party, such a request may correspond to a user desiring to access a supplemental VR container in the virtual living room, such as that provides background music to be heard by or otherwise available to all users present within the virtual living room. In this way, users may be able to obtain supplemental content for presentation to all users participating in a virtual container.

End user VR system 704 may transmit another supplemental content request 748 to VR provider 708 and receive, for example, a response 752, which may facilitate end user system 704 obtaining the desired supplemental content. For example, response 752 may provide a network address or other information (e.g., instructions) for obtaining the desired supplemental content. As illustrated, end user VR system 704 transmits the supplemental content request 748 directly to another supplemental content provider 716 that, in turn, transmits the supplemental content 756 back to end user VR system. As an example for the sporting event viewing party, the request may correspond to statistics information of a player of a team participating in the sporting event that may be provided only to end user VR system 704, such as overlaid on a video display of the living room environment associated with the virtual container. In this way, users may be able to obtain supplemental content for only their presentation without impacting the experience of other users. Such a technique, for example, may also be useful for accessibility features, as described above.

FIG. 7 also illustrates user source content stream 760 being transmitted from end user VR system 700 to VR provider 708. To facilitate transmission of this information to end user VR system 704, VR provider 708 may provide network address information 764 associated with end user VR system 704 to end user VR system 700 in order for end user VR system 704 to directly transmit user content stream 760 directly to end user VR system 704. As noted above, such a configuration is only one way that VR provider 708 may facilitate communication of data between end user VR systems. As another example, end user VR system 704 may transmit user source content stream 768 to VR provider 708, which may, in turn, relay user source content stream 768 to end user VR system 700.

It will be appreciated that FIG. 7 provides examples of how network connections may be established and how communications may be exchanged between devices. Other variations on the communications and network connections illustrated in FIG. 7 will be appreciated in view of the contents of the above description, such as where supplemental content requests are transmitted to different systems or take place in different orders and where supplemental content is generated in response to a request or transmission of a data stream to generate a transformed data stream as a supplemental content stream.

Figure 8:
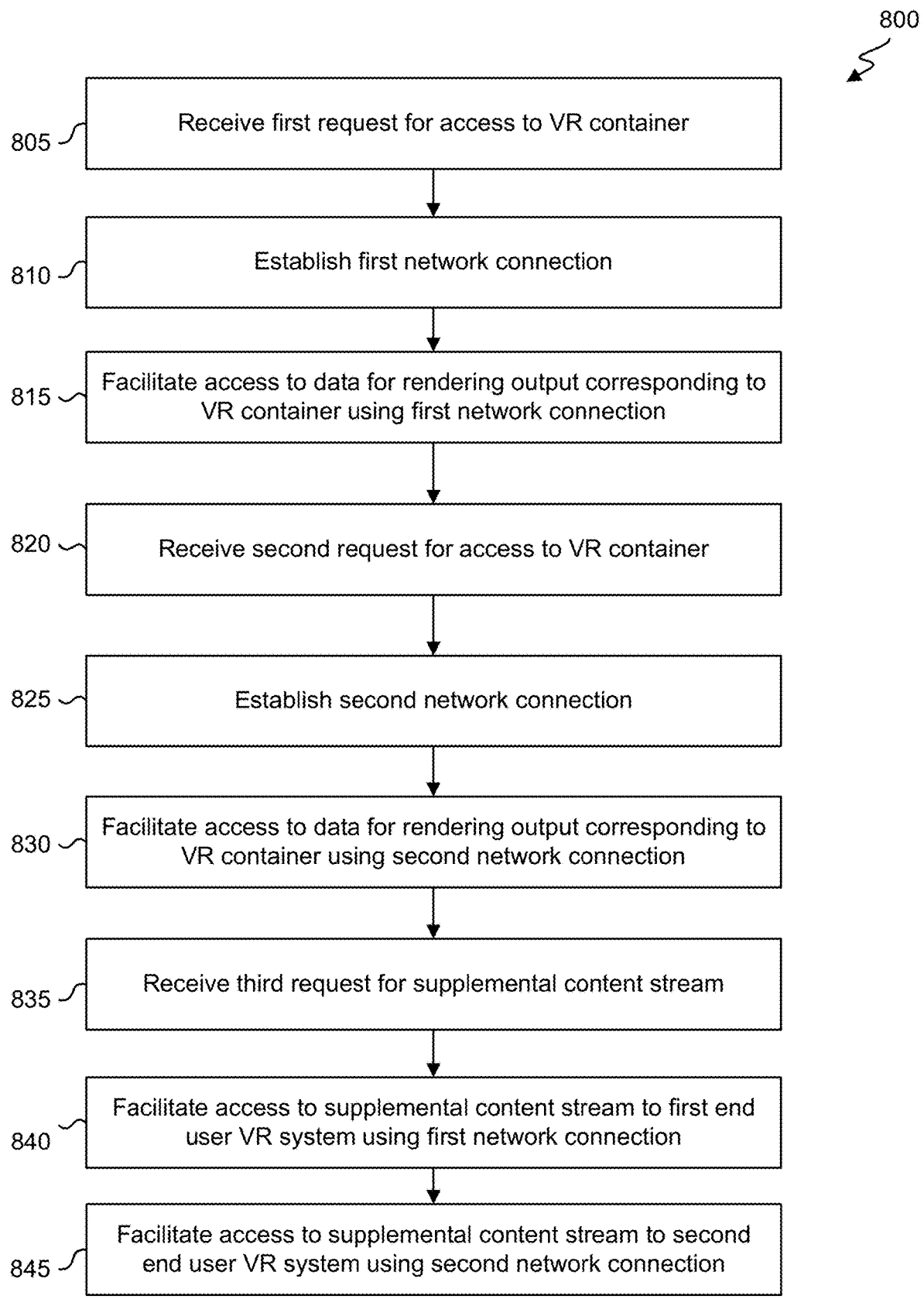
FIG. 8 provides an overview of an example method for accessing a virtual container and obtaining supplemental content from within the virtual container.

FIG. 8 provides an overview of an example method 800 for accessing a virtual container and obtaining supplemental content from within the virtual container. At block 805, a first request for access to a VR container is received, such as from a first end user VR system. At block 810, a first network connection is established, such as with the first end user VR system. At block 815, access to data for rendering output corresponding to the VR container is provided via the first network connection, such as by transmitting a VR container output stream or by transmitting an instruction set for directly generating a VR container output stream by the first end user VR system.

At block 820, a second request for access to a VR container is received, such as from a second end user VR system. At block 825, a second network connection is established, such as with the second end user VR system. At block 830, access to data for rendering output corresponding to the VR container is provided via the second network connection, such as by transmitting a VR container output stream or by transmitting an instruction set for directly generating a VR container output stream by the second user VR system. At block 835, a third request for access to a supplemental content stream is received, such as from the first end user VR system or the second end user VR system.

At block 840, access by the first end user VR system is facilitated to the supplemental content stream via the first network connection. At block 845, access by the second end user VR system is facilitated to the supplemental content stream via the second network connection. Facilitating access to the supplemental content stream optionally comprises obtaining the supplemental content stream and transmitting the supplemental content stream or data derived from the supplemental content stream, such as over a network connection. Facilitating access to the supplemental content stream optionally comprises including at least a portion of the supplemental content stream in the data for rendering output corresponding to the VR container. Facilitating access to the supplemental content stream optionally comprises transmitting a network address for a remote server that provides the supplemental content stream. In this way, the first or second end user VR device can obtain the supplemental content stream directly from the remote server.

Transmission of a user source content stream may be facilitated by receiving and transmitting at least a portion of the user source content stream, by transmitting a network address of an end user VR system providing the user source content stream to another end user VR system, or by transmitting a network address of an end user VR system to another end user VR system providing the user source content stream. In this way, the user source content stream may be relayed or allowed to be obtained directly from the source end user VR system generating the user source content stream.

Figure 9:
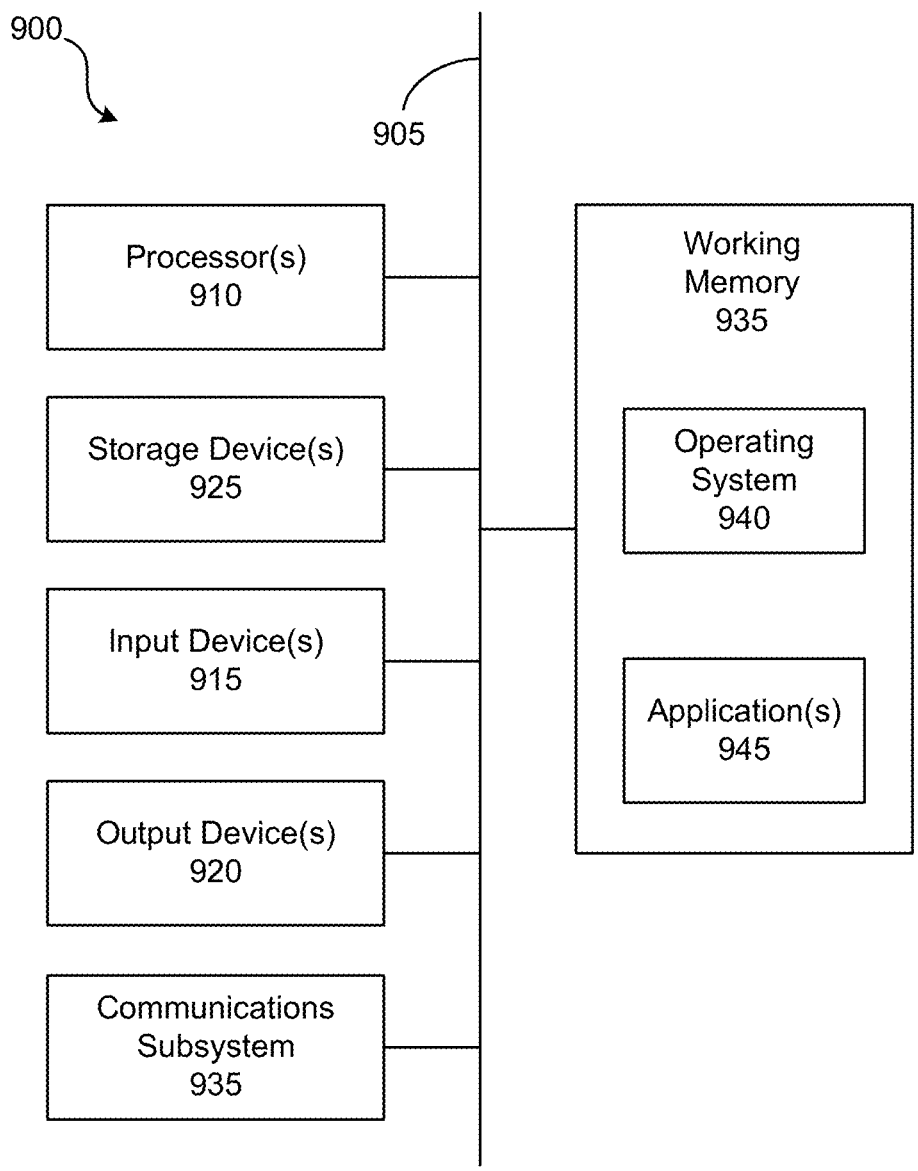
FIG. 9 provides a block diagram of an example computing device, in accordance with some embodiments.

A computing device as illustrated in FIG. 9 may be incorporated as part of the previously described devices, such as end user VR systems 105 and 200, service providers 115 and 204, remote VR providers 125, 130, 212 and 216, virtual container registry servers 145 and 208, etc. FIG. 9 provides a schematic illustration of one embodiment of a computing device 900 that may perform various steps of the methods provided by various embodiments. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computing device 900 is shown comprising hardware elements that may be electrically coupled via a bus 905 (or may otherwise be in communication). The hardware elements may include one or more processors 910, including without limitation one or more general-purpose processors and/or one or more special-purpose processors (such as digital signal processing chips, graphics acceleration processors, video decoders, and/or the like); one or more input devices 915, which may include without limitation a mouse, a touchscreen, keyboard, remote control, voice input, and/or the like; and one or more output devices 920, which may include without limitation a display device, a printer, speaker, etc.

The computing device 900 may further include (and/or be in communication with) one or more non-transitory storage devices 925, which may comprise, without limitation, local and/or network accessible storage, and/or may include, without limitation, a disk drive, a drive array, an optical storage device, a solid-state storage device, such as a solid state drive ("SSD"), random access memory ("RAM"), and/or a read-only memory ("ROM"), which may be programmable, flash-updateable and/or the like. Such storage devices may be configured to implement any appropriate data stores, including without limitation, various file systems, database structures, and/or the like.

The computing device 900 might also include a communications subsystem 930, which may include without limitation a modem, a network card (wireless or wired), an infrared or optical communication device, a wireless communication device, and/or a chipset (such as a Bluetooth™ device, BLE, an 802.11 device, an 802.15.4 device, a WiFi device, a WiMax device, cellular communication device, etc.), a G.hn device, and/or the like. The communications subsystem 930 may permit data to be exchanged with a network (such as the network described below, to name one example), other computer systems, and/or any other devices described herein. In many embodiments, the computing device 900 will further comprise a working memory 935, which may include a RAM or ROM device, as described above.

The computing device 900 also may comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the non-transitory storage device(s) 925 described above. In some cases, the storage medium might be incorporated within a computer system, such as computing device 900. In other embodiments, the storage medium might be separate from a computer system (e.g., a removable medium, such as a compact disc, or a cloud- or network-based storage system), and/or provided in an installation package, such that the storage medium may be used to program, configure, and/or adapt a general purpose computer with the instructions/code stored thereon. These instructions might take the form of executable code, which is executable by the computing device 900 and/or might take the form of source and/or installable code, which, upon compilation and/or installation on the computing device 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computing device (such as the computing device 900) to perform methods in accordance with various embodiments of the invention. According to a set of embodiments, some or all of the procedures of such methods are performed by the computing device 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the non-transitory storage device(s) 925. Merely by way of example, execution of the sequences of instructions contained in the working memory 935 might cause the processor(s) 910 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computing device 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer may read instructions and/or code. Network-based and cloud-based storage systems may also be useful forms of computer-readable media.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computing device 900.

The communications subsystem 930 (and/or components thereof) generally will receive signals, and the bus 905 then might carry the signals (and/or the data, instructions, etc. carried by the signals) to the working memory 935, from which the processor(s) 910 retrieves and executes the instructions. The instructions received by the working memory 935 may optionally be stored on a non-transitory storage device 925 either before or after execution by the processor(s) 910.

It should further be understood that the components of computing device 900 may be distributed across a network. For example, some processing may be performed in one location using a first processor while other processing may be performed by another processor remote from the first processor. Other components of computing device 900 may be similarly distributed. As such, computing device 900 may be interpreted as a distributed computing system that performs processing in multiple locations. In some instances, computing device 900 may be interpreted as a single computing device, such as a distinct laptop, desktop computer, or the like, depending on the context.

All references throughout this disclosure, for example patent documents including issued or granted patents or equivalents, patent application publications, and non-patent literature documents or other source material, are hereby incorporated by reference herein in their entireties, as though individually incorporated by reference, including the following patents and patent application publications: U.S. Pat. Nos. 5,950,202, 6,226,669; U.S. Patent Application Publications 2003/0008712, 2003/0177187, 2009/0089364, 2009/0100035, 2009/0262107, 2011/0014985, 2012/0050257, 2012/0054217; and PCT International Application Publication WO 2009/039080.

All patents and publications mentioned in this disclosure are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art.

When a group of substituents is disclosed herein, it is understood that all individual members of those groups and all subgroups and classes that can be formed using the substituents are disclosed separately. When a Markush group or other grouping is used herein, all individual members of the group and all combinations and subcombinations possible of the group are intended to be individually included in the disclosure. As used herein, "and/or" means that one, all, or any combination of items in a list separated by "and/or" are included in the list; for example "1, 2 and/or 3" is equivalent to "'1' or '2' or '3' or '1 and 2' or '1 and 3' or '2 and 3' or '1, 2 and 3'".

Every combination of components described or exemplified can be used to practice the invention, unless otherwise stated. Specific names of devices and components are intended to be exemplary, as it is known that one of skill in the art can name the same device or component differently. It will be appreciated that methods, device elements, and systems other than those specifically exemplified can be employed in the practice of the invention without resort to undue experimentation. All art-known functional equivalents, of any such methods, device elements, and systems are intended to be included in this description. Whenever a range is given in the above description, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of method, components of system, or elements of a device, is understood to encompass those consisting essentially of and consisting of the recited features. The invention illustratively described herein suitably may be practiced in the absence of any element or elements, limitation or limitations which is not specifically disclosed herein.

The methods, systems, and devices discussed above are examples. Various configurations may omit, substitute, or add various method steps or procedures, or system components as appropriate. For instance, in alternative configurations, the methods may be performed in an order different from that described, and/or various stages or steps or modules may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A method, comprising:
    establishing a first connection between a service provider virtual reality (VR) container and an end user VR system, wherein the first connection is associated with a service provider VR session;
    determining one or more portals, each for accessing a respective one of one or more remote VR containers from within the service provider VR session;
    populating the service provider VR container with the one or more portals;
    detecting input generated by the end user VR system within the service provider VR container, the input corresponding to an access instruction for accessing a first portal of the one or more portals; and
    facilitating, within the service provider VR session responsive to the input, establishing a second connection between the first remote VR container and the end user VR system via the first portal, wherein the second connection is associated with a first remote VR session.

2. The method of claim 1, wherein:
    the one or more remote VR containers comprises a plurality of remote VR containers, such that the service provider VR container is populated with a plurality of portals, each for accessing a respective one of the plurality of remote VR containers.

3. The method of claim 2, wherein:
    the detecting comprises detecting a plurality of inputs generated by the end user VR system within the service provider VR container, each input corresponding to an access instruction for accessing a respective portal of the one or more portals; and
    the facilitating comprises facilitating, within the service provider VR session responsive to each input of the plurality of inputs, establishing a respective connection between a respective one of the remote VR containers and the end user VR system via the respective portal corresponding to the input, each connection being associated with a respective remote VR session.

4. The method of claim 3, wherein the facilitating is such that at least one of the respective connections associated with a second remote VR session is established while the first remote VR session is active.

5. The method of claim 3, wherein the facilitating comprises, for each respective connection:
    determining respective requirements and capabilities for the respective remote VR container; and
    facilitating establishing the respective connection according to the respective requirements and capabilities for the respective remote VR container.

6. The method of claim 1, wherein establishing the first connection comprises:
    generating output, wherein the output is compatible with requirements of the end user VR system and corresponds to a VR container output stream transmitted to the end user VR system; and
    receiving a VR system output stream from the end user VR system.

7. The method of claim 1, wherein establishing the first connection comprises:
    transmitting an instruction set associated with the service provider VR container for execution by the end user VR system; and
    receiving data output generated according to execution of the instruction set.

8. The method of claim 1, wherein determining the one or more portals includes transmitting a query to a registry of virtual containers and receiving a query response identifying the one or more remote VR containers corresponding to the one or more portals.

9. The method of claim 8, wherein the query includes requirements or capabilities of the end user VR system that relate to establishment of connection between the end user VR system and the one or more remote VR containers.

10. The method of claim 8, wherein the registry of virtual containers includes a plurality of entries, wherein each entry corresponds to a virtual container and indicates an identifier associated with the virtual container, a requirement associated with the virtual container, a constraint associated with the virtual container, and/or a characteristic associated with the virtual container.

11. The method of claim 1, wherein populating the service provider VR container with the one or more portals includes obtaining one or more portal representations for the first portal and generating the first portal using a particular portal representation.

12. The method of claim 11, wherein the particular portal representation is associated with authentication credentials or tokens associated with a user of the end user VR system.

13. The method of claim 1, wherein facilitating establishing the second connection includes transmitting information associated with the first remote VR container to the end user VR system, wherein the information associated with the first remote VR container includes one or more of an address associated with the first remote VR container, requirements and capabilities associated with the first remote VR container, and a handshake protocol for establishing the connection with the first remote VR container.

14. The method of claim 13, wherein receiving the information associated with the first remote VR container at the end user VR system causes the end user VR system to establish the second connection with the first remote VR container.

15. The method of claim 1, wherein facilitating establishing the second connection includes:
receiving, from a content provider associated with the first remote VR container, a VR container output stream, wherein the VR container output stream is incompatible with requirements and capabilities of the end user VR system;
transforming the VR container output stream to generate a transformed output stream, wherein the transformed output stream is compatible with the requirements and capabilities of the end user VR system; and
transmitting the transformed output stream to the end user VR system.

16. The method of claim 15, wherein the transforming includes:
determining a first format of the VR container output stream;
determining a second format compatible with the requirements and capabilities of the end user VR system;
identifying a transformation protocol or algorithm for converting the first format to the second format; and
converting the VR container output stream to the transformed output stream according to the transformation protocol or algorithm.

17. The method of claim 1, wherein facilitating establishing a connection includes:
receiving, from the end user VR system, a VR input stream that is incompatible with the first remote VR container; and
transforming the VR input stream to generate a transformed input stream that is compatible with the first remote VR container; and
transmitting the transformed input stream to a content provider associated with the first remote VR container.

18. The method of claim 17, wherein transforming includes:
determining a first format of the VR input stream;
determining a second format compatible with the remote VR container;
identifying a transformation protocol or algorithm for converting the first format to the second format; and
converting the VR input stream to the transformed input stream according to the transformation protocol or algorithm.

19. A system, comprising:
one or more processors; and
a non-transitory computer readable storage medium in data communication with the one or more processors, the non-transitory computer readable storage medium including instructions that, when executed by the one or more processors, cause the one or more processors to perform operations including:
establishing a first connection between a service provider virtual reality (VR) container and an end user VR system, wherein the first connection is associated with a service provider VR session;
determining one or more portals, each for accessing a respective one of one or more remote VR containers from within the service provider VR session;
populating the service provider VR container with the one or more portals;
detecting input generated by the end user VR system within the service provider VR container, the input corresponding to an access instruction for accessing a first portal of the one or more portals; and
facilitating, within the service provider VR session responsive to the input, establishing a second connection between the first remote VR container and the end user VR system via the first portal, wherein the second connection is associated with a first remote VR session.

20. A non-transitory computer readable storage medium comprising instructions that, when executed by one or more processors, cause the one or more processors to perform operations including:
establishing a first connection between a service provider virtual reality (VR) container and an end user VR system, wherein the first connection is associated with a service provider VR session;
determining one or more portals, each for accessing a respective one of one or more remote VR containers from within the service provider VR session;
populating the service provider VR container with the one or more portals;
detecting input generated by the end user VR system within the service provider VR container, the input corresponding to an access instruction for accessing a first portal of the one or more portals; and
facilitating, within the service provider VR session responsive to the input, establishing a second connection between the first remote VR container and the end user VR system via the first portal, wherein the second connection is associated with a first remote VR session.

* * * * *